(12) United States Patent
Woodell et al.

(10) Patent No.: US 7,541,971 B1
(45) Date of Patent: Jun. 2, 2009

(54) AUTOMATIC BRIGHT BAND DETECTION AND COMPENSATION

(75) Inventors: Daniel L. Woodell, Robins, IA (US); Roy E. Robertson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/867,568

(22) Filed: Oct. 4, 2007

Related U.S. Application Data

(63) Continuation of application No. 11/039,753, filed on Jan. 20, 2005.

(51) Int. Cl.
*G01S 13/95* (2006.01)
*G01S 7/04* (2006.01)
*G01S 7/285* (2006.01)
*G01S 13/00* (2006.01)

(52) U.S. Cl. .................. 342/173; 342/26 R; 342/26 B; 342/89; 342/165; 342/175; 342/176; 342/181; 342/195

(58) Field of Classification Search .................. 382/254, 382/274; 342/26 R–26 D, 89–103, 165, 173–186, 342/192–197; 702/1–3
See application file for complete search history.

(56) References Cited

U.S. PATENT DOCUMENTS

| | | | |
|---|---|---|---|
| 2,656,531 A | 10/1953 | Atlas | |
| RE24,084 E | 11/1955 | Atlas | |
| 2,977,588 A | 3/1961 | Korman | |
| 2,994,079 A | 7/1961 | Obloy et al. | |
| 3,050,723 A | 8/1962 | Atlas | |
| 3,129,422 A | 4/1964 | Fox | |
| 4,268,828 A | 5/1981 | Cribbs et al. | |
| 5,640,469 A | 6/1997 | Lewins et al. | |
| 6,201,494 B1 | 3/2001 | Kronfeld | |
| 6,424,288 B1 | 7/2002 | Woodell | |
| 6,603,425 B1 | 8/2003 | Woodell | |
| 6,615,140 B2 | 9/2003 | White et al. | |
| 6,675,099 B2 | 1/2004 | Katsuhiro | |
| 6,741,203 B1 | 5/2004 | Woodell | |
| 2003/0025628 A1 | 2/2003 | Katsuhiro | |

FOREIGN PATENT DOCUMENTS

FR 2683913 5/1993

OTHER PUBLICATIONS

R. Sanchez-Diezma et al., "Identification of the Bright Band through the Analysis of Volumetric Radar Information"; J. Geophys. Res.; vol. 105; pp. 2225-2226; published in the year 2000.*
V. Venema et al., "Radar and Lidar Observations of the Melting Process in the Bright Band"; Proceedings of IGARSS 2000; Hawaii, USA; Jul. 2000.*

(Continued)

*Primary Examiner*—Bernarr E Gregory (57) ABSTRACT

A weather radar system has bright band detection and compensation. The weather radar system determines that high reflectivity in weather is a bright band and reduces an encoded return level from the bright band to compensate for it on a display. The weather radar system detects the presence of the bright band using an inference system that uses outside air temperature, aircraft altitude, and an assumed lapse rate to estimate the bright band location relative to the aircraft and uses antenna elevation to estimate bright band range to reduce the encoded radar return level on the display. The weather radar system may also detect the presence of the bright band using a detection system that uses radar estimates from normal reflectivity scan operation of the system. The weather radar system may also use an active detection process separate from a normal radar sampling process to detect the bright band.

20 Claims, 10 Drawing Sheets

OTHER PUBLICATIONS

F. Fabry, "Example: Melting layers (bright bands)"; Aug. 2000; posted on the Internet at www.radar.mcgill.ca; McGill University; Montreal, Quebec, Canada.

F. Fabry, "Example:Melting layers (bright bands)", http://www.radar.mcgill.ca/bright_band.html, Aug. 2000; 2 pages, McGill University; Montreal, Quebec, Canada.

* cited by examiner

AUTOMATIC BRIGHT BAND DETECTION AND COMPENSATION

CROSS-REFERENCE TO RELATED PATENT APPLICATIONS

This application is a continuation of and claims priority to U.S. application Ser. No. 11/039,753, filed Jan. 20, 2005, incorporated herein by reference in its entirety.

BACKGROUND OF THE INVENTION

This invention relates to weather radar and specifically for an airborne weather radar system capable of bright band detection and compensation.

Weather radars are known in the art for detecting and displaying severe weather to a crew in an aircraft on a two-dimensional map display showing range, bearing, and intensity of detected weather patterns such as convective or stratiform weather patterns. Flight hazards due to weather conditions are primarily the result of precipitation and turbulence. Airborne weather radar has been optimized to detect rain since rain drops act as an excellent reflector for the radar's microwave energy. Dry snow and ice crystals are very poor reflectors of radar energy. Wet hail provides the strongest reflection of radar energy. The size of the hail combined with the ability of the bipolar water molecules on its surface to align to reflect radar energy ensures maximum reflectivity levels. Dry hail reflects some radar energy simply due to its size. However, the crystal structure of the dry hail fails to reflect significant amounts of radar energy.

The level of radar returns from an area of weather is used to infer the relative hazard the weather is producing. Encode levels for weather radars are set to infer an aircraft threat from turbulence, lightning, and hail that are associated with convective weather. Some non-convective weather types produce similar return levels that would indicate hazardous conditions if these levels were associated with convective weather. A crew of an aircraft, following a reasonable avoidance strategy based on the assumption of the level of convective weather threat, may avoid regions that are not in fact threatening. This avoidance may result in delayed departures when radar indicates regions of threat while the aircraft is waiting for a clear region in which to plan its departure. Similarly, hold patterns or deviations may be executed during flight when radar-indicated hazardous regions are avoided even when they are indeed non-hazardous.

One such weather radar return is the return from a so-called bright-band. The bright band is a horizontal region in space that produces a larger radar return than the space either above or below it. It is caused by frozen hydrometers falling into air that is above the freezing point of water. The frozen hydrometers may be either hail or snow. As these hydrometers begin to melt, their icy structures are coated with liquid water. Since liquid water has a higher permittivity than ice, the liquid water produces larger radar returns than the original frozen hydrometer. For X-band radars, radar returns are produced by Rayleigh scattering from hydrometers of these sizes. Therefore, small increases in the effective hydrometer size produce large changes in the reflected radar return level. The effective size of the hydrometer may increase during the melting process. With a partially melted snowflake the liquid water coating produces longer liquid water dimensions than those produced by the water drop that results from the complete melting of the snowflake. The initial change from completely frozen to water coated as the hydrometer falls through the warm air produces a substantial increase in the radar reflectivity. The reflectivity then drops as the melting process is completed and a near spherical water droplet is produced.

The large radar return produced by the layer of melting hydrometers is the bright band. While it is likely many situations produce melting hydrometers, generally only non-hazardous stratiform weather produces the large patches of melting hydrometers that produce a bright band on the radar display. Convective weather may also have melting hydrometers but the regions of bright band are mixed with regions of truly higher rain rate induced high radar reflectivity. Therefore detecting and presenting this mixed weather environment as possibly hazardous is appropriate.

The bright band occurs most often in cool spring and fall weather conditions and is observed during approaches and departures with transitions through the freezing level and on the ground with surface temperatures just above freezing. The bright band is associated with stratiform rain and occurs between the freezing altitude and altitudes as much as 3,000 feet below the freezing altitude. In the bright band region, snowflakes and hail begin to melt and are coated with a layer of water producing very strong radar returns. If the radar beam is directed into this region it may cause a substantial portion of the radar display to display a caution or warning due to the fact that the stratiform rain clouds may cover a large geographical region. With red used to indicate warnings and yellow to indicate cautions on weather radar displays, the bright band has been the source of a "red-out" or an "amber-out" condition in which large portions of the weather radar display are indicated as hazardous or cautionary. The bright band produces bright radar reflections with low actual precipitation levels. If the aircraft encounters stratiform rain conditions and red out occurs at or near the freezing altitude, changing the tilt so that the radar beam is either above or below the area of the bright band may improve the radar display. In addition, turning radar system gain below a calibrated position may allow the flight crew to detect any hot spots or areas of severe precipitation that should be avoided. These changes in antenna tilt and radar system gain require crew interaction.

What is needed is a weather radar system capable of automatically detecting a bright band and compensating for its presence or notifying the aircrew of the presence of the bright band.

SUMMARY OF THE INVENTION

A weather radar system capable of bright band detection and compensation is disclosed. The weather radar system comprises a transmitter for transmitting pulses, an antenna for radiating the pulses and for receiving return pulses from a weather pattern, a receiver for processing the return pulses from the weather pattern and providing an output. A processor determines if a region of reflectivity is in the weather pattern from the receiver output and detects a presence of a bright band and reduces an encoded return level from the bright band region to compensate for the bright band. A display connected to the processor displays the weather pattern with the reduced encoded return levels for the bright band.

The processor uses outside air temperature, aircraft altitude, and an assumed lapse rate to estimate a location of the bright band relative to the aircraft altitude and uses an antenna pointing angle in elevation to estimate a range of the bright band to reduce the encoded radar return level to indicate a reduced threat on the display. The processor reduces the encoded return level from the bright band region only when there is little threat from convective weather. An example situation where hazardous convective weather is not likely is a condition with low surface temperatures. The processor varies an amount of reduction in encoded return level as a function of an amount of potential error in the estimation of bright band altitude with aircraft altitudes far from a freezing altitude. The processor uses a full decrease in the encoded return level when the aircraft is in surface operation with a surface temperature near freezing. The processor reduces or eliminates reduction of the encoded return level when the aircraft is at medium to high altitudes with a freezing attitude thousands of feet below the aircraft due to substantial uncertainties about bright band location.

The weather radar system may also detect the presence of the bright band using a detection system that uses radar estimates from normal reflectivity scan operation of the weather radar system. The weather radar system detects the presence of the bright band while the aircraft is on the ground with an upward tilt antenna angle that generates a beam that scans upward through a possible bright band region and receives peak radar returns from the bright band when the bright band is generally large in extent with a scale length longer than about 10 nautical miles, thereby indicating an existence of the bright band embedded in stratiform weather and causing the processor to reduce the encoded return level displayed on the display. The processor varies an amount of reduction in the encoded return level as a function of certainty of occurrence of the bright band with about a 10 nautical mile length resulting in beginning the encoded return level reduction process and about a 30 nautical mile scale length resulting in a maximum encoded return level reduction.

The aircraft operates at moderate altitudes with antenna tilts below a horizon that scan the bright band giving radar return reflectivity peaks and a long weather extent that are used by the processor to decrease an encoded return level. The decrease in encoded return level is a function of an accuracy of an estimated bright band location with large aircraft altitude offsets from an estimated freezing altitude producing little or no encoded return level reduction and small offsets in aircraft altitude producing maximum encoded return level reduction.

Aircraft operation at moderate to low altitudes may produce antenna tilts that generate beams that are substantially in parallel with the bright band thereby not allowing a sampling through a possible bright band altitude. In such conditions the encoded return level is not reduced by the processor.

Aircraft operation at moderate to low altitudes may produce antenna tilts that generate beams that are substantially in parallel with the bright band wherein the beam contains the bright band along its length and extent length. In such conditions the encoded return level reduction is limited.

The weather radar system may use an active detection process where the weather radar system operates separately from a normal radar sampling process to detect the bright band. A region in space is sampled by a radar beam from the antenna that is swept vertically to estimate a peak reflectivity altitude of the bright band and to estimate an extent to ascertain a likelihood of bright band, wherein with bright band altitude and likelihood being estimated, the processor applies an appropriate amount of encoded return level reduction. When weather height is substantially above a freezing band, the weather is not generally stratiform and the radar encoded return level is not decreased by the processor.

In the weather radar system, the encoded return level reduction process changes only a cautionary return level and leaves a warning level alone to allow substantial threats to be detected when the weather radar system may have spuriously detected the bright band or detected the bright band in the presence of a convective weather pattern.

It is an object of the present invention to provide a weather radar system capable of automatic bright band detection and compensation.

It is an object of the present invention to provide an aircrew with a radar display that compensates for the presence of the bright band.

It is an advantage of the present invention to provide an inference based system and a detection based system for bright band.

It is an advantage of the present invention to provide bright band detection and compensation for an existing weather radar system with little modification.

It is a feature of the present invention to provide bright band detection and compensation to avoid incorrect assessment of a weather threat by an aircrew.

BRIEF DESCRIPTION OF THE DRAWINGS

The invention may be more fully understood by reading the following description of the preferred embodiments of the invention in conjunction with the appended drawings wherein.

DETAILED DESCRIPTION OF THE PREFERRED EMBODIMENTS

The present invention is for a weather radar system capable of bright band detection and compensation.

Figure 1:
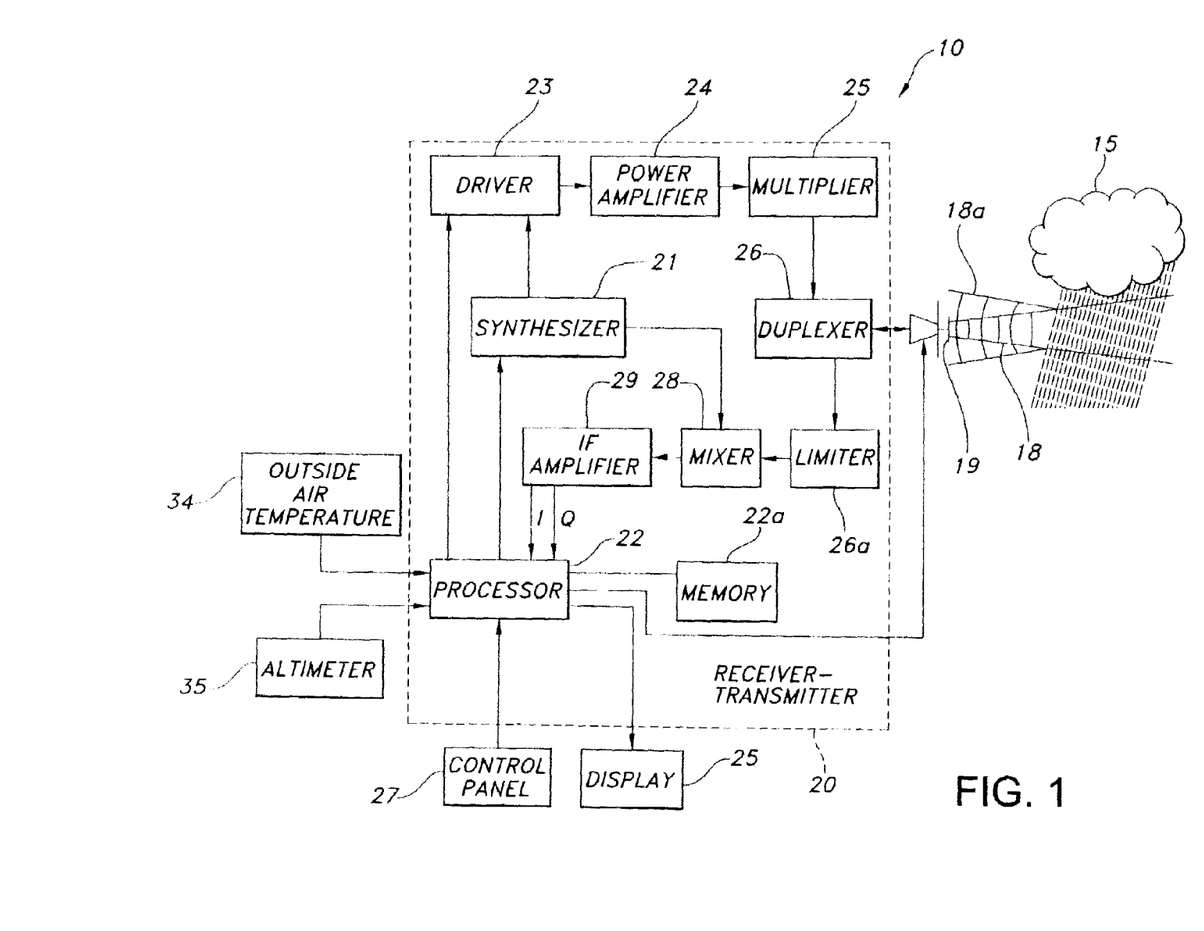
FIG. 1 is a block diagram of an exemplary weather radar system that may incorporate the present invention.

Weather radars are known in the art for detecting severe weather and for providing a flight crew in an aircraft a two-dimensional map display showing range, bearing, and intensity of detected weather patterns. Flight hazards due to weather conditions are primarily the result of precipitation and turbulence. A block diagram of a representative weather radar 10 that may incorporate the present invention for bright band detection and compensation is shown in FIG. 1. The weather radar 10 may be a WXR-2100 MULTISCAN™ Weather Radar System manufactured by Rockwell Collins Inc. and is used herein as an exemplary weather radar system in which to incorporate the present invention.

In FIG. 1 pulses 18 are transmitted from the weather radar system 10 using antenna 19 and reflected from a target 15 as return pulses 18a that are received by the antenna 19. Within a receiver-transmitter 20 the transmitted pulses 18 are generated using a reference signal from a synthesizer 21. The width and pulse repetition frequency (PRF) of the pulses 18 are generated in a driver 23 and controlled by a processor 22. The pulses 18 are amplified in power amplifier 24 and multiplied to a final transmit frequency in multiplier 25. A duplexer 26 directs the multiplier 25 output to the antenna 19.

The return pulses 18a from the target 15 are passed through the duplexer 26 to a limiter 26a where strong return pulses 18a are attenuated. The output of the limiter 26a is connected to a mixer 28 where the return pulses 18a are down converted in frequency by mixing with an oscillator signal from the synthesizer 21 to produce an intermediate frequency (IF) return signal that is amplified by an IF amplifier 29.

The IF return signal is converted into in-phase (I) and quadrature (Q) components and digitized in the IF amplifier 29. The digitized return signals are then processed by the processor 22. The processor 22 uses a series of algorithms to determine the magnitude, spectral width, and velocity gradients of each return pulse 18a.

The results of the processed returns are then encoded to a serial data word that is sent to a system display 25. The encoded return level serial data word is the reflectivity data and message information to be displayed to the flight crew. The colors on the display 25 indicate the encoded return level reflectivity with black representing zero to minimal reflectivity, green representing light reflectivity, yellow indicating moderate reflectivity, red representing heavy to extreme reflectivity, and magenta indicating turbulence.

A weather radar system control panel 27 provides control signals to the weather radar system receiver-transmitter 20. Depending upon the weather radar system configuration, the control panel 27 provides operating mode selection, ground clutter suppression selection, system select, antenna tilt control in manual mode, and system gain control.

The amount of energy returned in the return pulses 18a depends on the reflective quality of the target 15. When short pulses strike a target 15 such as precipitation, some of the energy is absorbed, some of it is refracted, and the remainder is reflected. Heavy rainfall produces the strongest reflections; light rainfall, snow, and ice crystals produce weak returns.

The strength of the return pulses 18a is also related to the distance the pulses must travel. Radar systems compensate for the attenuation of the signal due to the distance traveled with a sensitivity time control (STC) function (not shown). The STC function controls receiver sensitivity with respect to time and thus range. The receiver sensitivity increases during the period between transmitted pulses when the receiver is listening for return pulses.

The return pulses 18a provide strength information and range to the target 15 such as a thunderstorm in FIG. 1. The range of the target 15 is determined by the amount of elapsed time that occurs between the transmission of a pulse 18 and the reception of the reflected or return pulse 18a. The direction or azimuth bearing of the target 15 is determined by noting the azimuth pointing position of the antenna 19. Bearing and range information is then coupled with the reflectivity information and applied to the display 25.

The exemplary WXR-2100 MULTISCAN™ Weather Radar System is capable of operating in an automatic multiscan mode with processor 22 controlling the weather radar system gain and antenna 19 tilt functions over multiple tilt settings and storing the individual scan data in a memory 22a of the system receiver-transmitter 20. This scan data is continually refreshed and corrected in the memory 22a for aircraft motion by processor 22. The data sent to the system display 25 is a composite of multiple scans that have been processed to remove ground clutter and refine the image. This operation optimizes the display images shown to the flight crew by showing short, mid, and long range weather targets.

Figure 2:
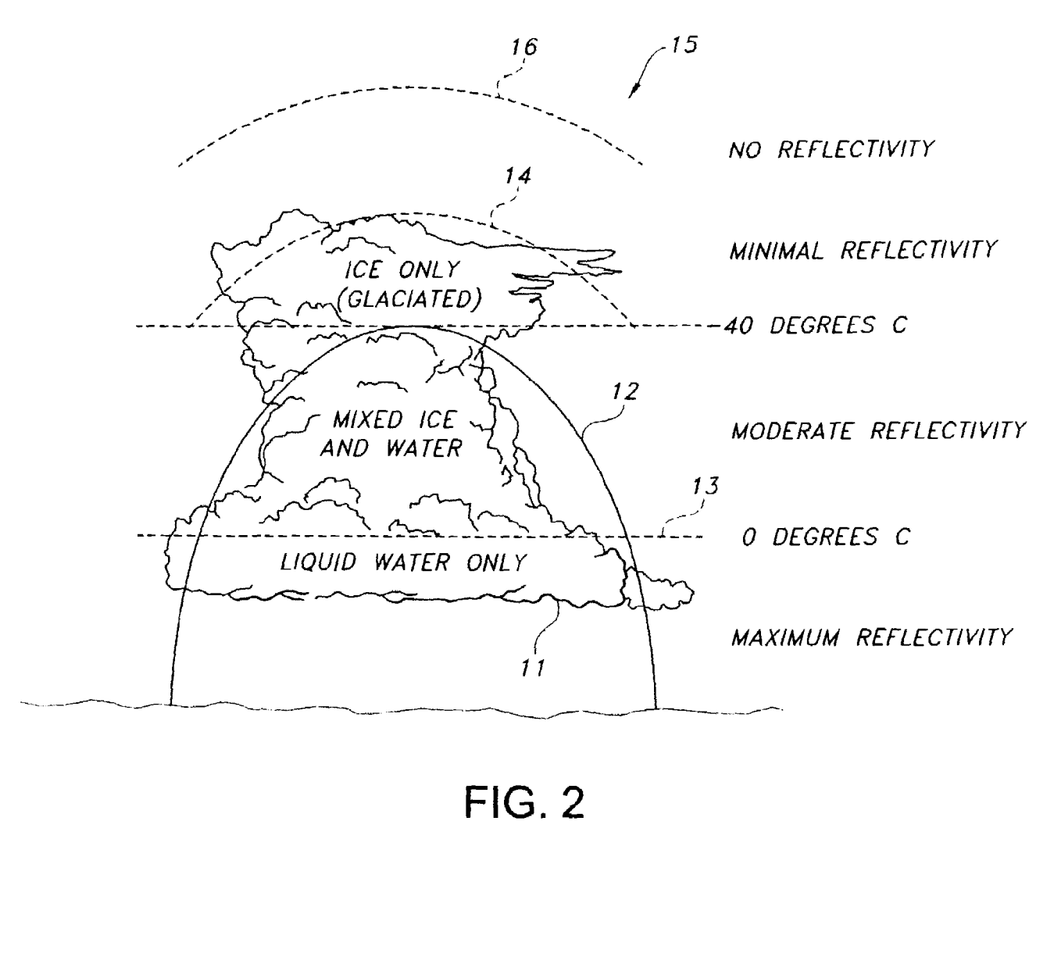
FIG. 2 is a diagram illustrating the geometric distribution of typical thunderstorm.

In the exemplary weather radar system 10, the total time required to complete one cycle of multiple tilt scans in any of the weather detection modes except windshear is eight seconds. In the windshear mode a complete cycle requires 11.2 seconds. To compensate for aircraft movement during the multiple scans the digital image is translated and rotated in the memory 22a under processor 22 control. This weather radar operation is described in U.S. Pat. No. 6,424,288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell. Both patents are assigned to the assignee of the present invention and incorporated herein by reference To understand multiscan operation, it is necessary to understand a typical thunderstorm. FIG. 2 is a diagram illustrating the geometric distribution of typical thunderstorm 15. A portion 11 of thunderstorm 15 at the lowest altitude contains liquid water only. This wet portion 11 has a high level of radar reflectivity. Above a freezing level 13, thunderstorm 15 includes a mixture of ice and water, with moderate radar reflectivity, and a portion of thunderstorm 15 above a temperature level of about −40 degrees C. contains ice only, with relatively low radar reflectivity. Above the ice portion of thunderstorm 15, there is a region 16 with little or no radar reflectivity, where turbulence may exist due to a building thunderstorm 15.

Based on the geometry of thunderstorm 15, regions may be defined by their ability to be detected by radar, their visibility, and their effect on an aircraft. Region 12, which includes the liquid water and the mixed ice and water portions of thunderstorm 15, is a region that is detectable by the aircraft weather radar system 10, due to the high and moderate radar reflectivity of those portions of the thunderstorm 15. Region 14, which includes the ice portion of thunderstorm 15, is a region that is visible to a pilot but is not normally detectable by radar, due to the low radar reflectivity of the ice portion of thunderstorm 15. Region 16 is not visible or detectable by radar, but is a region of possible high turbulence that can affect the stability of an aircraft passing through.

Since most weather threats are associated with convective weather such as thunderstorm 15, the detection of convective weather should be optimized throughout such weather's maturity cycle. Optimal convective weather detection samples the region of space at or near the freezing altitude 13 in the atmosphere since detectable reflectivity begins at this altitude and reflectivity is strongest at this altitude for most of a convective weather cell's life cycle.

Figure 3:
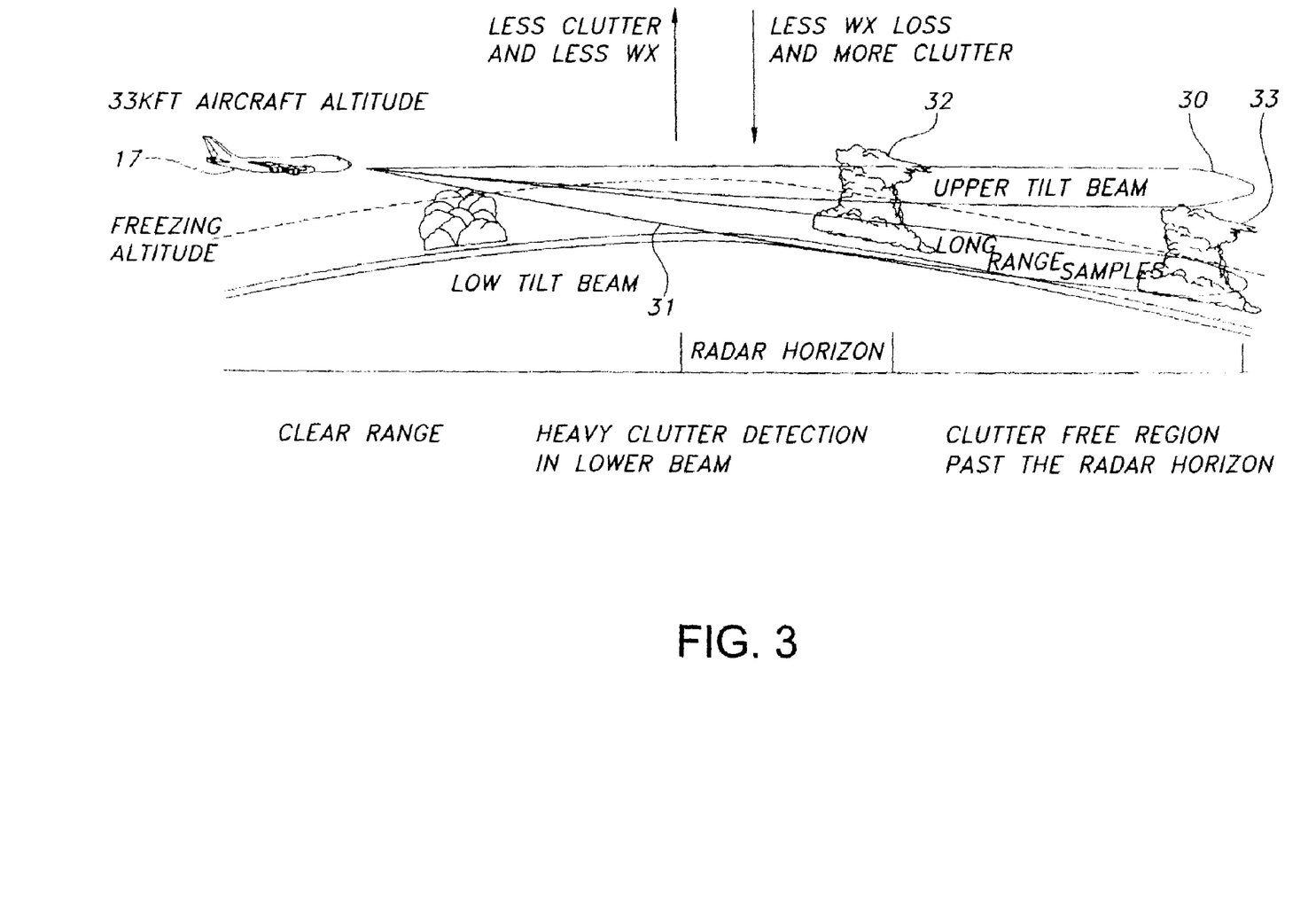
FIG. 3 illustrates multiscan operation of the weather radar system of FIG. 1.

FIG. 3 shows an aircraft 17 flying at 33,000 feet using an upper tilt beam 30 and lower tilt beam 31 to illuminate weather (precipitation) targets 32 and 33. During multiscan operation the receiver-transmitter 20 transmits, during a clockwise sweep, a non-windshear pulse pattern at the upper tilt angle. The next sweep the receiver-transmitter 20 transmits the non-windshear pulse pattern at the lower tilt angle. The tilt angles used during multiscan operation are dependent upon aircraft 17 barometric altitude and the terrain height. Reflectivity data is gathered from both tilt scans at four different frequencies using two different pulse widths. The data is placed into memory 22a in memory planes, with each scan generating a short pulse memory plane (0 to 44 nm) and a long pulse memory plane (0 to 320 mm). For an upper and lower tilt beam a total of four memory planes are generated.

The processor 22 performs several algorithms that identify ground clutter within the reflectivity using scan-to-scan correlation and beam-to-beam correlation. The data stored in the memory planes is used to support all selected ranges, modes of operation, and selected display options. Transmit pulse widths of 6 and 25 microseconds build 512 sample bins for long range data and 256 sample bins for short range data in the system.

The memory is geographically aligned in memory planes. The data in each plane is located so that the target data can be correlated between each of the memory planes. The data stored is averaged and filtered with each subsequent scan. The data is continually refreshed and corrected for aircraft motion. All significant weather data is available in the memory planes.

When the data is processed for display, the data from the short range pulses and long range pulses from both the upper and lower tilt scans is merged, ground clutter eliminated, the flight crew commanded display options are processed and the weather optimized display data is sent to the display 25. The data sent to the display 25 is generated from the four memory planes and not directly related to the antenna scan. The data sampling process has been decoupled from the display 25 process to provide the multiple beam advantage of a merged, optimized display of weather targets from 0 to 320 nm.

System 10 is designed for fully automatic operation. For automatic operation the flight crew selects the automatic function, a display mode WX (weather), WX+T (weather plus turbulence), or TURB (turbulence), and a desired range. Once in automatic mode the processor 22 adjusts antenna 19 tilt and receiver gain to provide an optimum weather display for any range scale. In the WX+T and TURB modes, turbulence is displayed out to 40 nm for all selected ranges. Because multiscan operation uses multiple scans to detect all significant weather targets, the entire weather picture from 0 to 320 nm is stored in memory 22a. This includes turbulence data and precipitation velocity variances.

Turbulent areas within a precipitation weather target 15 can be identified by Doppler processing of transmit and receive signals in the weather radar system 10. A turbulent target is a target that exhibits a wide variance in particle velocities. The velocity variance of droplets can be thought of as a spectrum of velocities. The broader the spectrum, the greater the turbulence in the weather target. To provide an accurate spectrum of return signal frequencies, a large number of samples (returns) must be used to produce accurate and reliable results. The threshold of turbulent targets in precipitation exceeds a velocity width of 5 meters/second. This threshold translates into a Doppler frequency shift of 312.5 Hz. For this reason, PRF in the turbulence mode of operation is increased to 1838 pulses/second. With this large number of transmit pulses 18, the receiver-transmitter 20 processes every pulse for precipitation information and provides turbulence data from the spectrum of Doppler shifts caused by precipitation movement. Because of the high PRF rate, the maximum range for turbulence detection is approximately 44 miles. This range limit is established to prevent range ambiguity so subsequent pulsed transmissions do not saturate the receiver.

Once an accurate spectrum of return signals is obtained, the turbulence processor circuits determine if the spectrum represents a spectrum of a turbulent target. The alert threshold for passenger carrying air transport aircraft is approximately 5 to 7.5 meters per second. The five meter per second threshold corresponds to the threshold between light and moderate turbulence that can cause food and beverage spillage or possible minor injury.

The frequency of the return signal is offset from the transmitted frequency because of the Doppler shift caused by the velocity of the aircraft 17 with respect to the target 15. In addition to the frequency shift caused by the aircraft velocity, a frequency shift is caused by the movement of the precipitation. To measure the spectrum width of the frequency shifts caused by precipitation movement, the Doppler shift due to the aircraft must be filtered out.

The pulse width transmitted is selected based upon the selected range and mode of operation. By using multiple pulse widths, the receiver-transmitter 20 can optimize the operation of the system for a particular range and operation mode. This optimization provides a better resolution in the weather display and efficient use of the transmitted energy. Another factor selected in the receiver-transmitter 20 to optimize performance is the pulse repetition frequency (PRF). PRF optimization is possible with separating detection from assessment. At shorter selected ranges, the receiver portion of the receiver-transmitter 20 is not required to listen for relatively long periods of time. The transmitter is then free to increase the number of transmitted pulses 18. The greater number of transmitted pulses provides more information and a faster update of weather targets present. The PRF may be optimized for detection of a weather pattern and then changed to a PRF optimized for assessment.

Figure 4:
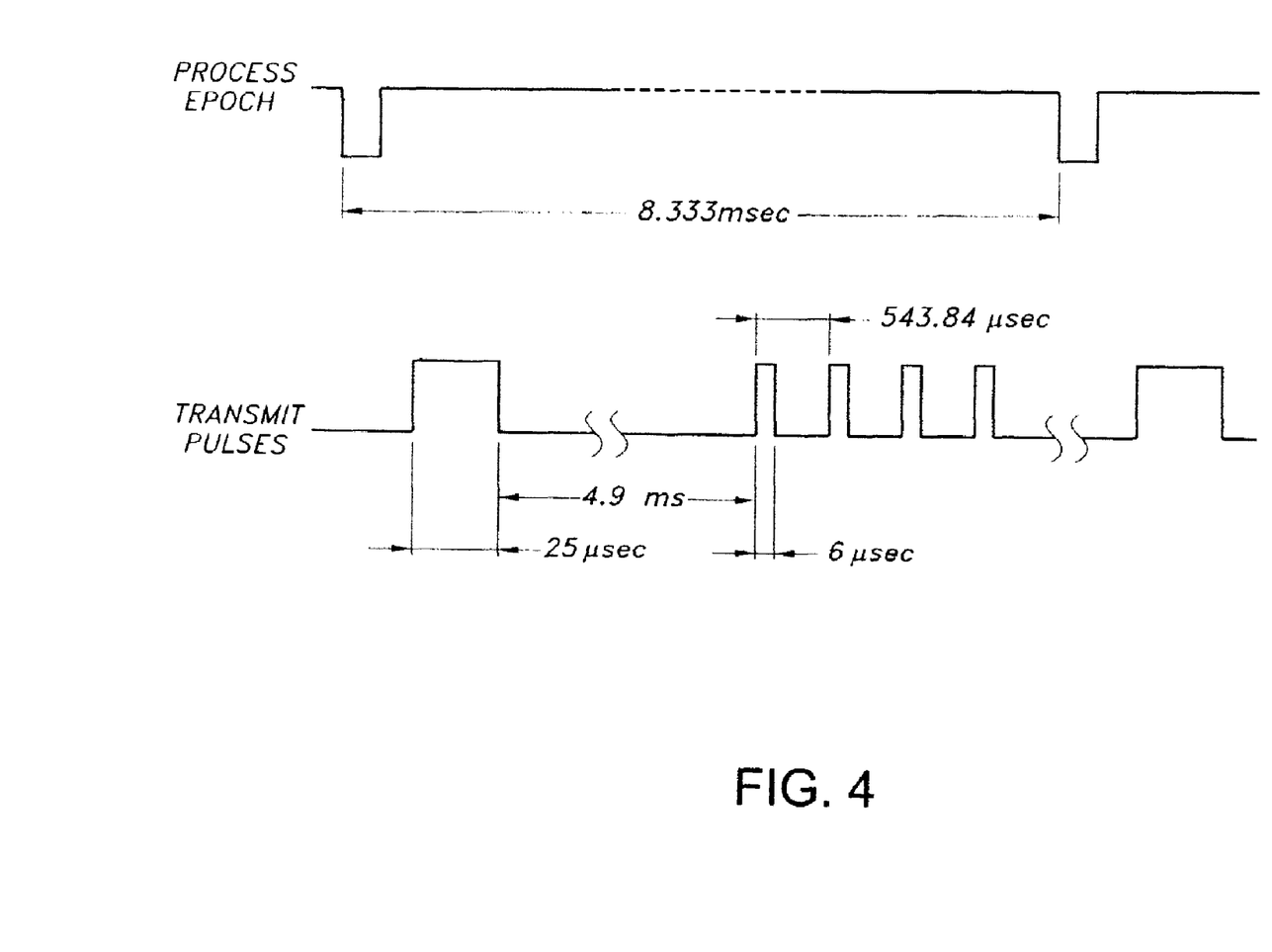
FIG. 4 shows a typical pattern of transmitted pulses for non-windshear operation in the weather radar system of FIG. 1 for a reflectivity mode.

A typical pattern of transmitted pulses 18 for non-windshear operation in the weather radar system 10 is shown in FIG. 4 for the weather mode. For any selected range one 25-microsecond pulse and four 6-microsecond pulses are transmitted during each process epoch of 8.333 milliseconds in this example. After transmitting the 25-microsecond pulse there is a 4.9-millisecond space. This allows returns from targets as far away as 331 nautical miles. A process epoch is the time interval in which a radial of radar data is processed. This time is equal to the size of the radar processing element in degrees divided by the antenna 19 scan rate. This pulse pattern is transmitted at each radial of the antenna 19 scan. The transmitted frequency alternates between seven weather transmit channel frequencies. For example, the weather radar system 10 is operating in a weather detection mode and the antenna 19 is scanning clockwise. At the 0-degree radial the transmitter transmits the pulse pattern of FIG. 4 on a first transmit channel frequency of seven frequencies. At the completion of that epoch the antenna 19 moves a ⅜-degree clockwise and the pulse pattern is transmitted again at one of the six remaining frequencies. At the next ⅜-degree radial of the antenna 19, the transmit pulse pattern is repeated at one of the remaining six transmit frequencies. The pulse pattern and seven frequencies are used for all non-windshear modes of operation such as weather, turbulence, weather plus turbulence, and ground mapping detection.

Bright band detection and compensation of the present invention may be incorporated in the weather radar system 10 of FIG. 1. Bright band region induced reflectivity may be inferred or detected with the present invention. The weather radar system 10 operates in a normal reflectivity mode and, when inferring or detecting a region of high reflectivity in a bright band, compensates for the bright band by reducing the encoded return level serial data word that is sent to the display 25 to change color on the display to indicate a reduced reflectivity for the region of the bright band.

Figure 5:
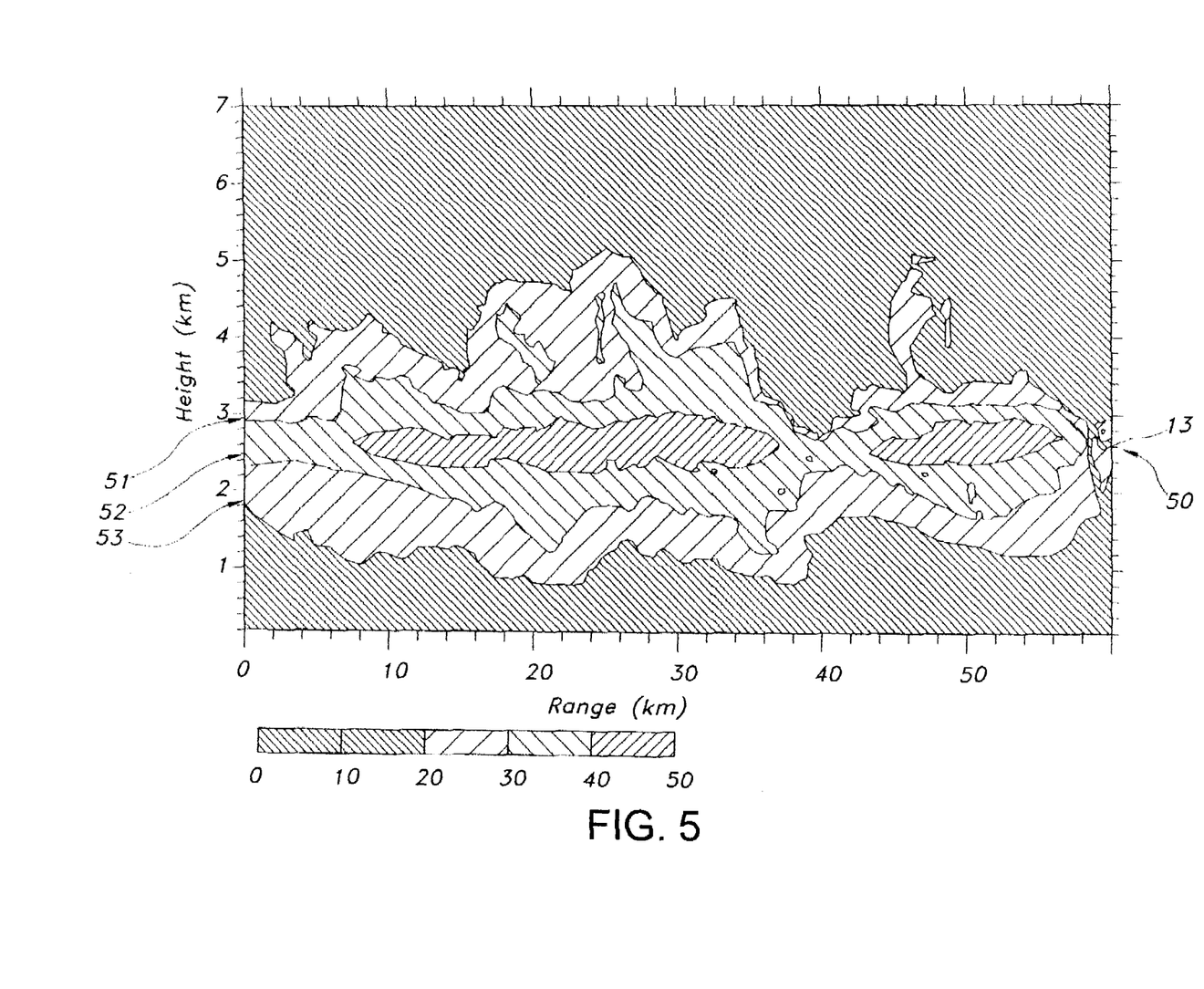
FIG. 5 shows a typical bright band that the weather radar system of FIG. 1 detects and compensates for on a display.

A typical bright band region 50 as it appears on a vertically scanned RHI (range height indicator) weather radar display is shown in FIG. 5. The bright band region 50 occurs at about 2500 m in altitude and extends in range over 50 km in this example. In the bright band region 50, areas of high reflectivity are over 30 dBZ and are encoded to be displayed as yellow areas with some areas in red that may be over 40 dBZ on the display 25. The majority of bright band is cautionary and is displayed as yellow with some hazardous regions appearing as red. A first region 51 is the melting point region just above freezing altitude 13. In this first region 51, the snowflakes or ice crystals are just beginning to melt and form a water coating with a low reflectivity of about 20 dBZ over about 1 km of altitude and are encoded as a green area.

The bright band 52 is below the first region 51 and has a flat top reflectivity characteristic as shown in FIG. 5. This flat-top bright band region 52 is produced by a very high vertical reflectivity gradient that appears at a near constant altitude over a substantial horizontal extent, over 50 km in this example. In the bright band 52, the water-coated snowflakes have their highest reflectivity of over 30 dBZ (encoded as yellow) and may increase to over 40 dBZ (encoded as red) near the freezing altitude 13.

A third region 53 below the bright band 52 has a lower reflectivity and large spatial extent of reflections. The third region 53 in FIG. 5 has a low reflectivity of 20 to 30 dBZ shown as green over the extent of 55 km and is the region where the snowflakes or hail have melted and formed rain drops.

Figure 6:
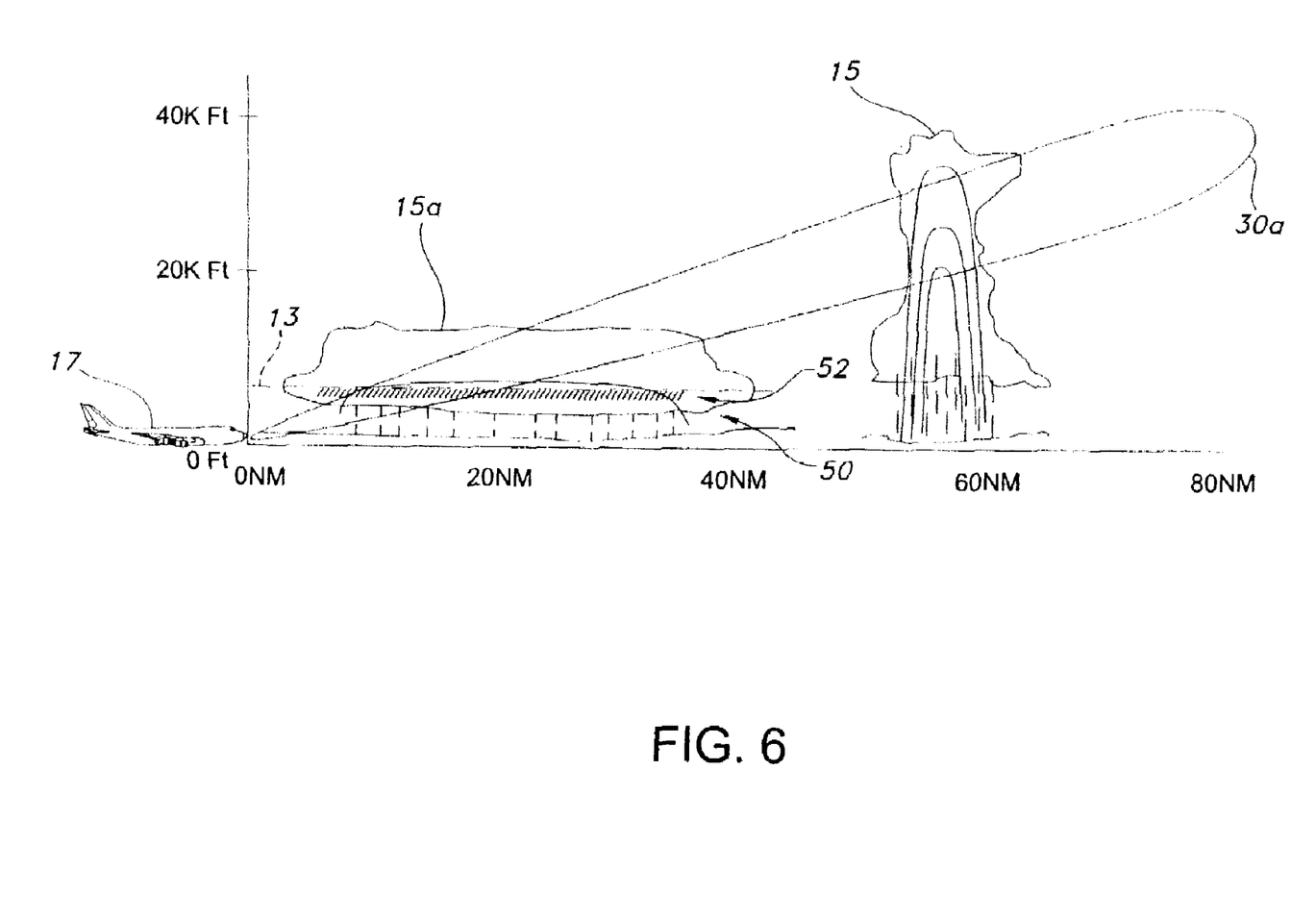
FIG. 6 shows an aircraft on the ground with beams having upward tilts to detect a bright band.
Figure 6A:
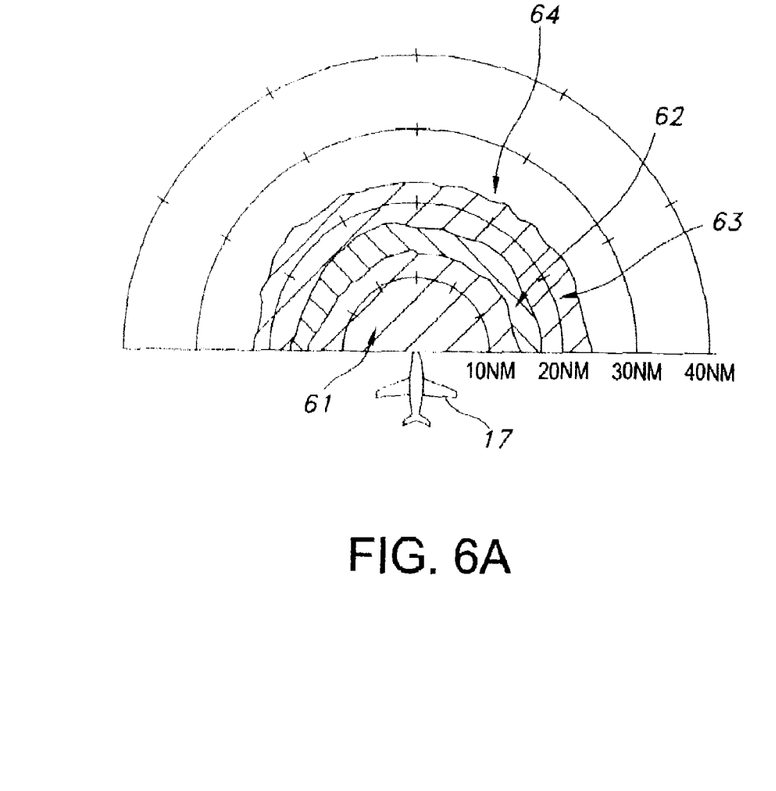
FIG. 6*a* shows a weather radar display image of a bright band with an upward antenna tilt angle from an aircraft at low altitude or on the ground.

FIG. 6 shows an aircraft 17 located at low altitude or on the ground. A radar beam 30a with an upward antenna tilt angle is directed towards stratiform weather system 15a, slicing through the bright band region 50 and detecting bright band 52 near freezing altitude 13. Convective weather system 15 is shown for comparison purposes. The beam 30a provides returns that result in an image on the weather radar display 25 as shown in FIG. 6a. Aircraft 17 is located at the center of concentric range rings at 10 nm, 20 nm, 30 nm, and 40 nm. Area 61 in FIG. 6a is encoded green on the display 25 indicating low reflectivity precipitation below the bright band indication 62 in the figure that is encoded as a high reflectivity area in yellow. Area 63 is encoded as precipitation in green above the bright band indication 62. The area 64 is the display of the beam 30a above the stratiform weather system 15a.

Figure 7:
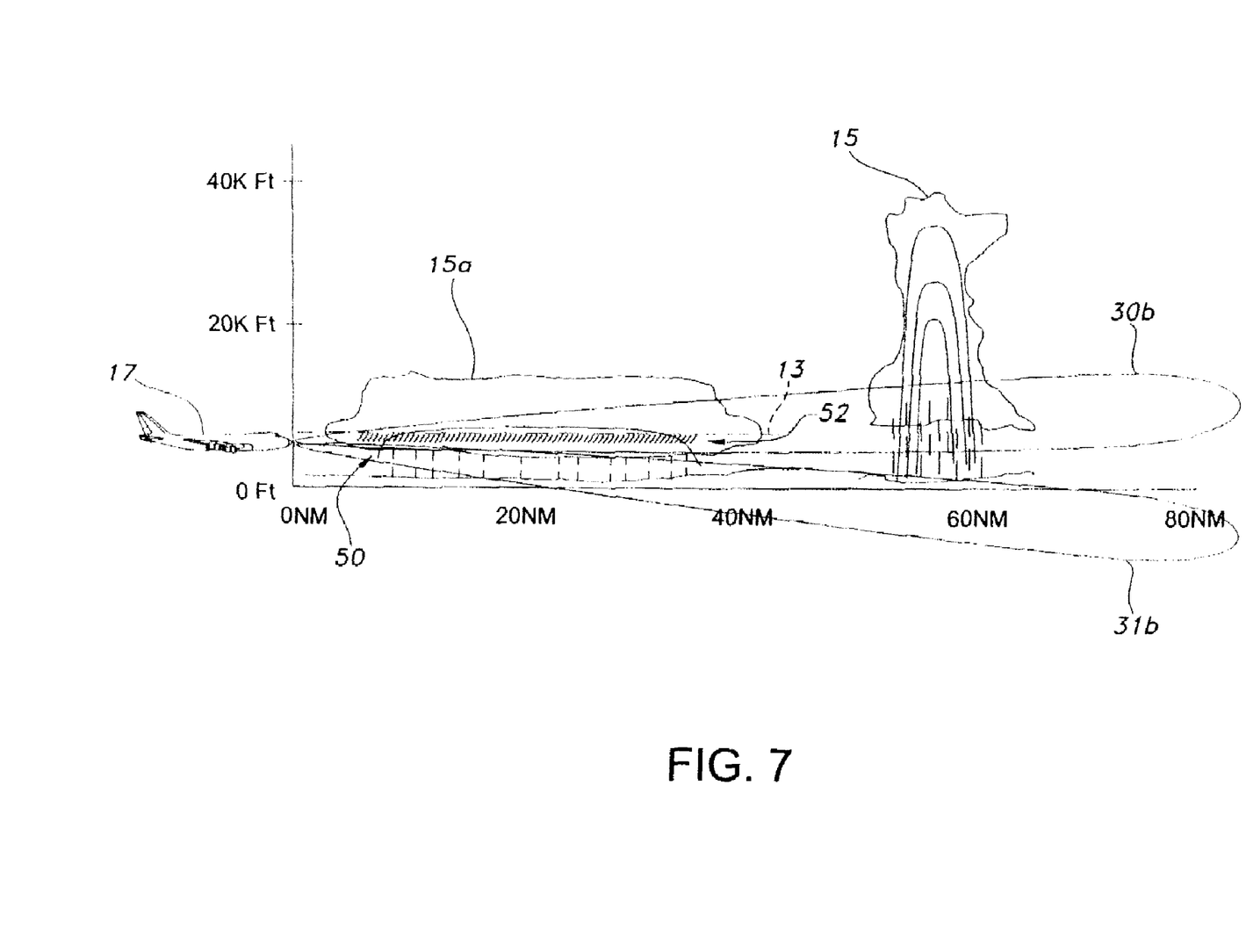
FIG. 7 shows an aircraft at moderate altitudes detecting a bright band.
Figure 7A:
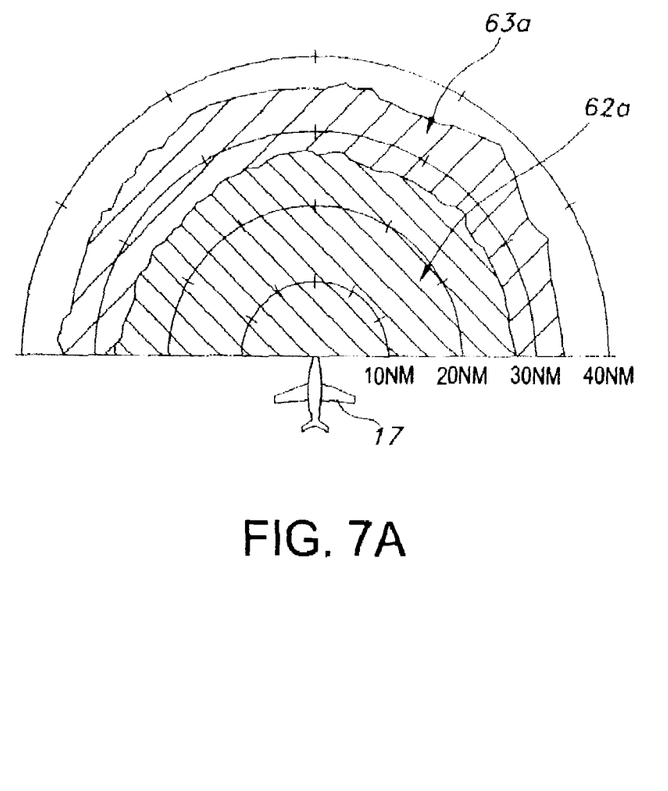
FIG. 7*a* shows a weather radar display image of a bright band with an antenna beam parallel to the bright band from an aircraft at medium altitude.

FIG. 7 shows aircraft 17 at a medium altitude with antenna beam 30b substantially parallel to bright band 52 near freezing altitude 13 in bright band region 50 in stratiform weather system 15a. Antenna beam 30b provides returns that result in an image on weather radar display 25 as shown in FIG. 7a with aircraft 17 again located among range rings as in shown in FIG. 6a. Since the beam 30b is parallel to the bright band 52, the bright band indication 62a covers a substantial area of the display 25 going from immediately in front of the aircraft 17 out to about 28 nm in this example. The bright band indication 62a is again encoded as yellow in FIG. 7a. Area 63 is low level precipitation and is encoded as green in FIG. 7a.

Bright band region 50 induced reflectivity may be inferred or detected in the present invention. The encoded return levels from the bright band region 50 may be reduced by the processor 22 to reflect the reduced threat the bright band 52 may produce. Return levels encoded as yellow for the bright band 52 may be reduced to green on the display 25. The problem therefore separates itself into two sub-problems; the detection or inference of the bright band region 50 and the reduction in encoded return levels from these regions to compensate the display 25.

With the inference based system, the processor 22 uses outside air temperature obtained from an outside air temperature sensor 34 (see FIG. 1) on the aircraft, aircraft altitude obtained from an altimeter 35, and antenna 19 tilt angle to estimate the presence of a bright band 52 and adjust encoded return levels from the bright band region 50 accordingly. The temperature of the atmosphere decreases as altitude increases. The rate at which air temperature decreases with altitude increases is called the atmospheric lapse rate. Lapse rate is generally well behaved and is typically about 2 degrees centigrade per 1000 feet of height in the lower altitude troposphere where bright band 52 occurs. The bright band 52 occurs at altitudes just below the freezing altitude 13 in the atmosphere and extends between 300 and 1000 feet below that altitude. Using the outside air temperature along with an assumed lapse rate, the location of the possible bright band 52 relative to the aircraft's altitude is estimated by the processor 22. For example if the outside air temperature is 2 degrees C., the bright band 52 is located 1000 feet above the present aircraft altitude. Since the radar antenna 19 pointing angle in elevation is known, the range at which the radar beam is sampling the bright band 52 can be estimated by the processor 22 from the tilt angle and the bright band altitude using simple geometry. For cases where there is little threat from convective weather, the encoded return level may be decreased for the bright band region 50 at the range the bright band 52 is estimated to be located to indicate the reduced threat on the display 25. Such cases include low surface temperature situations that do not generally support convective weather. This is extremely useful since the stratiform weather that supports the generation of confusing bright band signatures is generally associated with these lower surface temperatures.

Since the inferred system uses lapse rate that is only an estimate, aircraft altitudes far from the freezing altitude 13 can produce substantial bright band 52 altitude estimate errors. To minimize the reduction of encoded return levels in regions spuriously identified as produced by the bright band 52, the amount of decrease of the encoded return level is a function of the amount of potential error in the estimation of bright band 52 altitude. As an example, surface operation of the aircraft with temperatures just above freezing produces very good estimates of the bright band altitudes and a full decrease in encoded return levels can be used by the processor 22. Aircraft operation at medium to high altitudes with the freezing attitude 13 many thousands of feet below the aircraft produces substantial uncertainties about the altitude of the possible bright band 52. Therefore reduction of encoded return level is reduced or eliminated by the processor 22.

A detection system for bright band 52 of the present invention may either use information that is generated from normal operation of the weather radar system 10 or may use specific radar sampling methods to detect the bright band 52.

Detection methods that use radar estimates from normal operation of the weather radar system 10 may be used for bright band 52 detection. Referring again to FIG. 6, radar operation while the aircraft 17 is on the ground generally uses antenna beam 30a with upward tilts that minimize ground clutter and examine weather aloft along an expected flight path after takeoff. This situation represents the longest exposure of the aircraft 17 to misidentified hazards produced by bright band 52 returns from near the freezing level 13 from a stratiform weather system 15a. All other situations are dynamic in nature and therefore do not exist for long periods of time. The upward tilt antenna 19 angle generally used on the ground generates a beam that slices upward through any possible bright band region 50 in stratiform weather system 15a. Radar returns containing the bright band 52 show peak reflectivity radar returns for the bright band 52 from the bright band region 50. The stratiform system 15a that produces the bright band signature 52 is generally large in extent as discussed above in conjunction with FIG. 5. While a convective weather system 15 contains cells with scale length in the 3 to 10 nautical mile range, stratiform rain generally exists over much longer ranges. Therefore a reflectivity detection peak at a range inside the bright band region 50 with scale lengths longer than about 10 nautical miles detected during normal reflectivity scan operation of the weather radar system 10 is a good indicator of a bright band 52 and causes processor 22 to reduce the encoded return level displayed on the display 25 for the bright band region 50. Again the amount of encoded return level turn-down can be a function of the certainty of the bright band hypothesis. About a 10 nautical mile length that is on the boundary of convection 15 versus stratiform weather 15a may only begin the encoded return level turn-down process, while about a 30 nautical mile scale length produces a maximum encoded return level turn-down as determined by the processor 22. Regions with hazards spuriously produced by bright band 52 may be stored by the processor 22 in memory 22a for later use during climb-out.

Operation at moderate altitudes produces an antenna beam 31b with tilts below the horizon that again may slice through the potential region 50 of bright band 52 as shown in FIG. 7. As in the on-ground or low altitude case given above, radar return peaks coexisting with the estimated bright band 52 location and long weather extent for the stratiform weather system 15a can be used to produce an encoded return level decrease for the bright band region 50 by the processor 22. Again, the decrease in the encoded return level is a function of the accuracy of the bright band 52 altitude estimation with large aircraft altitude offsets from the estimated freezing altitude 13 producing little or no encoded return level reduction while small offsets in altitude produce maximum reduction.

Aircraft operation at moderate to low altitudes, shown in FIG. 7, may produce antenna beams 30b with tilts that do not slice through the bright band 52 but are substantially parallel to the location of the bright band 52. In cases where the beam 30b is not sampling the possible bright band altitude, no encoded return level modifications are made by the processor 22. In cases where the beam 30b contains the bright band 52 along its length, the length of the stratiform weather system 15a can be used to justify some level of turn-down but the peak reflectivity at and below the freezing altitude 13 is not available due to the antenna 19 tilt angle. Therefore without some prior determination or evidence of the bright band 52, turn-down is limited or eliminated by the processor 22.

Figure 8:
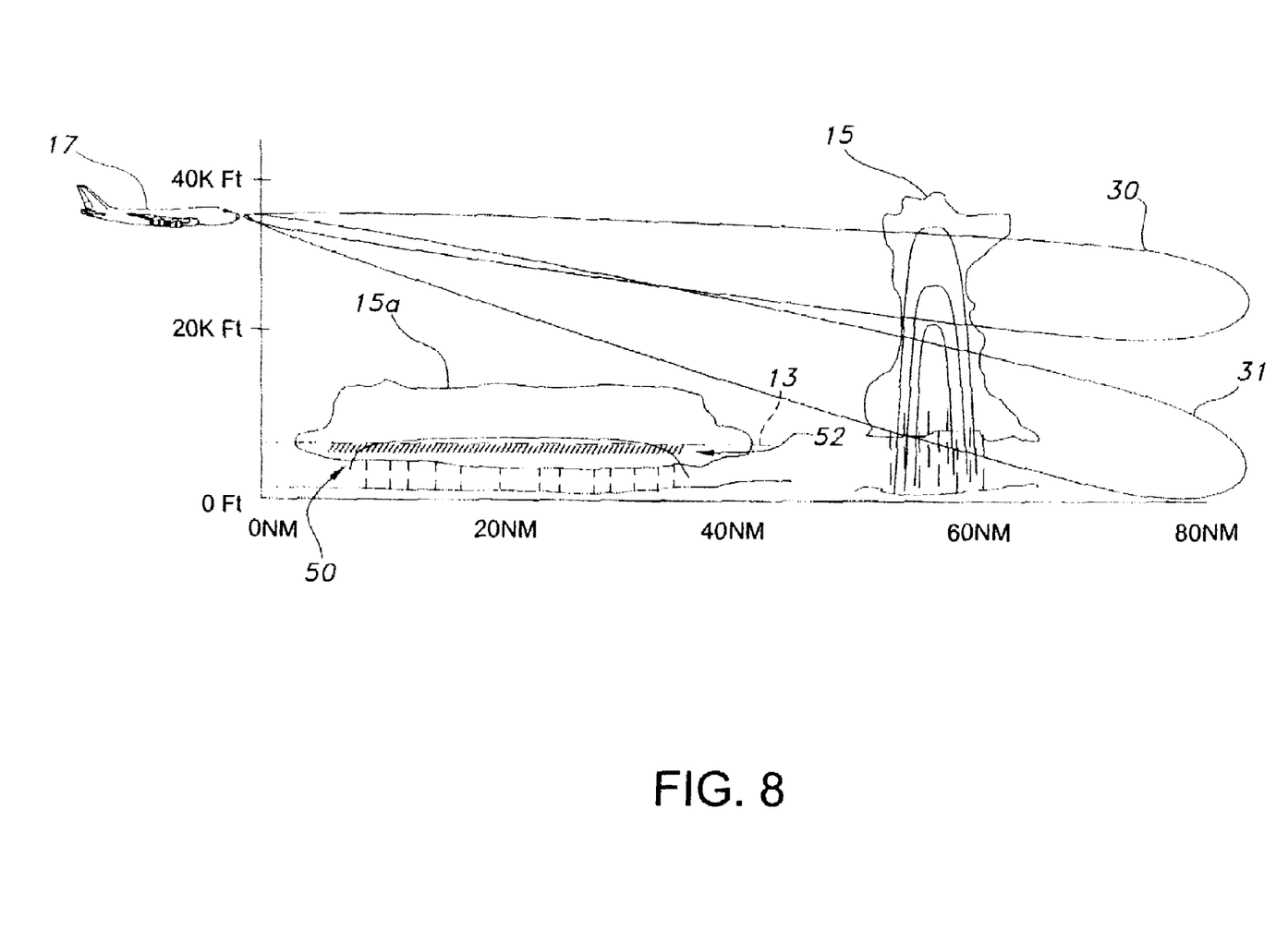
FIG. 8 shows an aircraft at high altitudes not detecting a bright band.

Aircraft 17 operation at high altitude is shown in FIG. 8 where beams 30 and 31 do not slice thought the bright band region 50 containing bright band 52 at freezing altitude 13 in stratiform weather system 15a and no reduction in encoded level is made. Beams 30 and 31 do detect the convective weather system 15 as part of the normal radar reflectivity scanning process.

Figure 9:
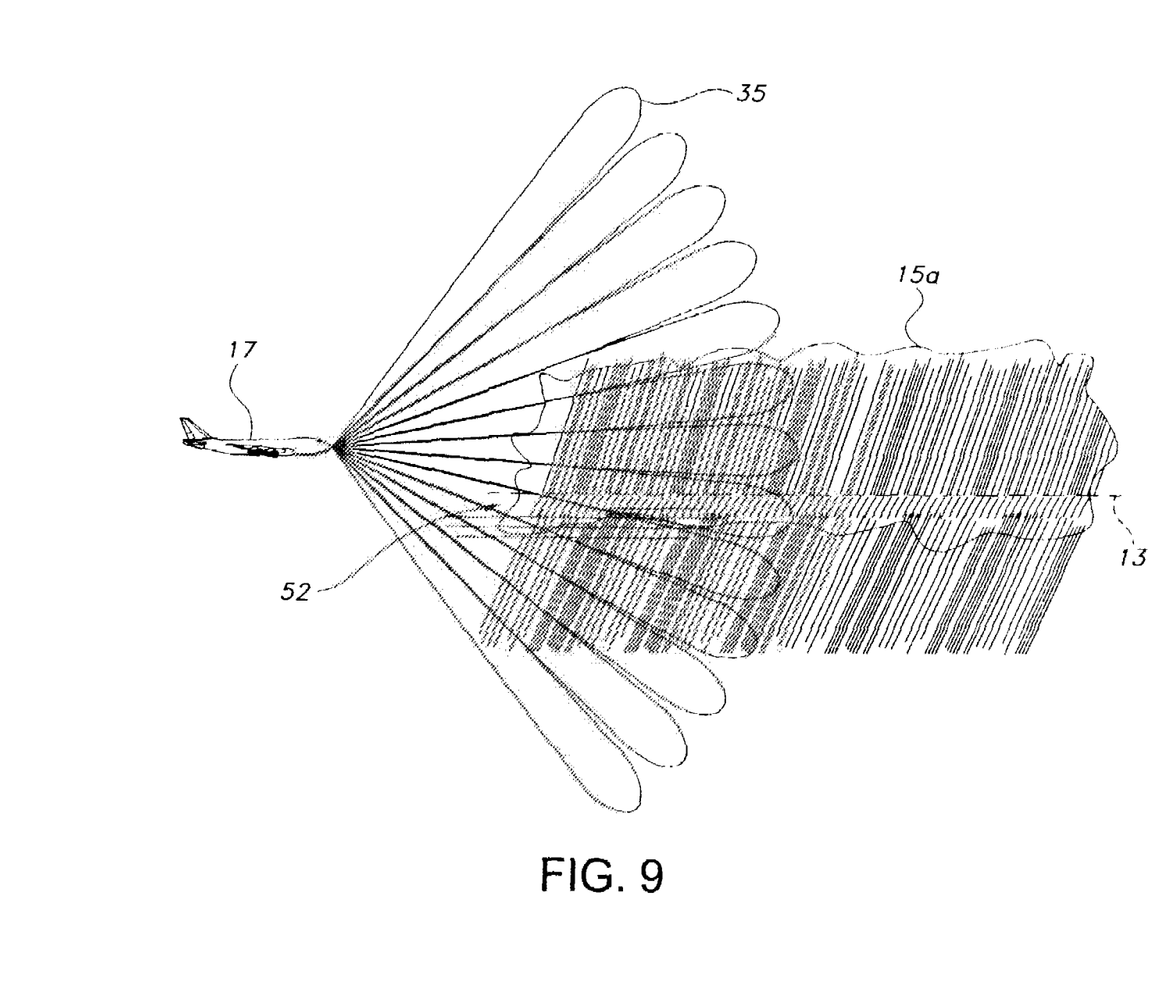
FIG. 9 is a diagram illustrating the weather radar system of FIG. 1 performing a vertical scan of a stratiform weather system that may contain a bright band.

An active detection process of the present invention uses weather radar system 10 time and is separate from the normal radar reflectivity scanning process. The weather radar system 10 may use the reflectivity scanning process previously described for active detection of bright band 52 in the dedicated active detection time interval. In the bright band detection mode the weather radar system 10 vertically scans the volume in front of aircraft 17 with main beam 35 as shown in FIG. 9. A horizontal scanning pattern with increments in tilt angle may also be used. The weather radar system 10 may use the reflectivity pulse pattern of FIG. 4. The weather radar system 10 may use the MULTISCAN™ process or any other multiple scan process as previously described. In FIG. 9 the radar beam 35 is swept vertically by the weather radar system 10 on aircraft 17 to scan a stratiform weather system 15a. The stratiform weather system 15a is larger in range extent than the convective weather system that is typically the thunderstorm 15 previously described in FIG. 2. While the aircraft 17 may be either above, at, or below the bright band 52 (located near freezing altitude 13), the sweeping of the antenna 19 allows a peak reflectivity altitude to be estimated by the processor 22. With this estimation along with an extent determination, the likelihood of bright band 52 may be ascertained. With bright band 52 location and likelihood being estimated, an appropriate amount of encoded return level turn-down may be produced by the processor 22 for the bright band region 50. In addition to extent qualification, weather height may also be used in this active detection system. Since it takes energy to loft weather to a substantial height above the freezing altitude 13, weather that has substantial vertical extent above the freezing altitude 13 is not generally stratiform but may be convective 15 (see FIG. 2) and the radar encoded return level should not be decreased.

The encoded return level turn-down process is performed by the processor 22 as previously discussed. Since the detection process is somewhat statistically made, turning down the radar encoded return level when the process for bright band 52 detection has spuriously detected a bright band 52 situation has consequences that must be mitigated. There is some room for mitigation since most bright band 52 situations produce returns that are generally cautionary (yellow area) and not warning (red area) in nature. Changing only the cautionary return level and leaving the warning level alone allows substantial threats to be detected even when the system may have spuriously detected the bright band 52 or detected the bright band 52 in the presence of a convective weather pattern 15. Furthermore, leaving the lowest level of detected weather output alone allows the weather detection to still match the pilot's perception of weather "out the window".

It is believed that the automatic bright band detection and compensation weather radar of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of detecting and compensating for a bright band in a weather radar system on board an aircraft, the method comprising:
   at least one of the steps of:
      (a) detecting presence of the bright band using an inference system,
      (b) detecting the presence of the bright band using radar estimates from a first reflectivity scan process of the weather radar system, or
      (c) detecting the presence of the bright band using an active detection process separate from the first reflectivity scan process, wherein the active detection process is configured for improved detection of the bright band using the weather radar system relative to the first reflectivity scan process;
   and
   compensating for the bright band by reducing a level of indication on a display in a region corresponding to the bright band.

2. The method of detecting and compensating for a bright band in a weather radar system of claim 1 wherein the step of detecting the presence of the bright band using an inference system further comprises the steps of:

using outside air temperature, aircraft altitude, and an assumed lapse rate to estimate a location of the bright band relative to an aircraft altitude; and using an antenna pointing angle in elevation to estimate a range of the bright band.

3. The method of detecting and compensating for a bright band in a weather system of claim 2 further comprising the step of reducing an encoded return level when surface temperatures are near freezing.

4. The method of detecting and compensating for a bright band in a weather radar system of claim 2 further comprising the steps of:

minimizing the reduction of the encoded return level in regions spuriously identified as bright band produced; and varying an amount of decrease in the encoded return level as a function of an amount of potential error in the estimation of bright band altitude with aircraft altitude far from a freezing altitude.

5. The method of detecting and compensating for a bright band in a weather system of claim 2 further comprising the step of decreasing fully the encoded return level when the aircraft is in surface operation with surface temperature near freezing.

6. The method of detecting and compensating for a bright band in a weather radar system of claim 2 further comprising the step of reducing or eliminating reduction of the encoded return level when the aircraft is at an altitude substantially above a freezing attitude.

7. The method of detecting and compensating for a bright band in a weather radar system of claim 1 wherein the step of detecting the presence of the bright band using radar estimates from a first reflectivity scan operation of the weather radar system further comprises the steps of:

detecting the presence of the bright band using an upward tilt antenna angle;

generating a beam that scans upward through a possible bright band region; and receiving peak radar returns from the bright band wherein the bright band is generally large in extent with a length longer than about 10 nautical miles thereby indicating an existence of the bright band.

8. The method of detecting and compensating for a bright band in a weather radar system of claim 7 further comprising the step of varying an amount of reduction in encoded return level as a function of certainty of occurrence of the bright band, with about a 10 nautical mile length resulting in beginning the encoded return level reduction process, and about a 30 nautical mile length producing a maximum encoded return level reduction.

9. The method of detecting and compensating for a bright band in a weather radar system of claim 7 further comprising the steps of:

operating the aircraft at moderate altitudes; and scanning a region of bright band with an antenna tilt angle with beams below a horizon to receive radar returns with reflectivity peaks from an estimated bright band location and with a long weather extent that are used to decrease an encoded return level.

10. The method of detecting and compensating for a bright band in a weather radar system of claim 9 further comprising the step of decreasing the encoded return level as a function of an accuracy of the estimated bright band location, with large aircraft altitude offsets from an estimated freezing altitude producing little or no encoded return level reduction, and small offsets in aircraft altitude producing maximum encoded return level reduction.

11. The method of detecting and compensating for a bright band in a weather radar system of claim 7 further comprising the step of operating the aircraft at altitudes that produce antenna tilts with beams substantially in parallel with the bright band that do not sample the bright band thereby not reducing an encoded return level.

12. The method of detecting and compensating for a bright band in a weather radar system of claim 7 further comprising the steps of:

operating the aircraft at moderate to low altitudes;

producing antenna tilts with beams that are substantially in parallel with a location of the bright band wherein the beam contains the bright band along its length; and reducing an encoded return level based on weather extent length.

13. The method of detecting and compensating for a bright band in a weather radar system of claim 1 wherein the step of using an active detection process separate from the first reflectivity scan process to detect the bright band further comprises the steps of:

sampling a region in space by a radar beam that is swept vertically; and estimating a peak reflectivity altitude and an extent of peak reflectivity to estimate a likelihood of bright band.

14. The method of detecting and compensating for a bright band in weather radar system of claim 13 further comprising the step of not decreasing a radar encoded return level when weather height is a substantial vertical height above a freezing band.

15. The method of detecting and compensating for a bright band in a weather radar system of claim 1 where the step of compensating for the bright band by reducing a level of indication on a display in a region corresponding to the bright band further comprises applying an appropriate amount of encoded return level reduction when bright band location and likelihood are estimated.

16. The method of detecting and compensating for a bright band in a weather radar system of claim 1, wherein the method comprises the step of detecting the presence of the bright band using an active detection process separate from the first reflectivity scan process, wherein the active detection process is configured for improved detection of the bright band using the weather radar system relative to the first reflectivity scan process.

17. The method of detecting and compensating for a bright band in weather radar system of claim 1, wherein the method comprises the step of detecting the presence of the bright band using radar estimates from a first reflectivity scan process of the weather radar system.

18. A method of detecting and compensating for a bright band in a weather radar system on board an aircraft, the method comprising:

detecting the presences and determining the location of the bright band by using at least one of:

(a) an inference system, (b) radar estimates from a first reflectivity scan operation of the weather radar system, or (c) an active detection process separate from the first reflectivity scan process, wherein the active detection process is configured for improved detection of the bright band using the weather radar system relative to the first reflectivity scan process;

and compensating for the bright band by reducing indication intensity or color on a display region corresponding to the determined location of the bright band.

19. The method of detecting and compensating for a bright band in a weather radar system of claim 18 wherein the step of detecting the presence and determining the location of the bright band using radar estimates from a first reflectivity scan operation of the weather radar system further comprises the steps of:

detecting the presence of the bright band using an upward tilt antenna angle;

generating a beam that scans upward through a possible bright band region; and receiving peak radar returns from the bright band wherein the bright band is generally large in extent with a length longer than about 10 nautical miles thereby indicating an existence of the bright band.

20. The method of detecting and compensating for a bright band in a weather radar system of claim 18 wherein the step of detecting the presence and determining the location of the bright band using an inference system further comprises the steps of:

using outside air temperature, aircraft altitude, and an assumed lapse rate to estimate a location of the bright band relative to an aircraft altitude; and using an antenna pointing angle in elevation to estimate a range of the bright band.

* * * * *